US011469468B2

(12) United States Patent
Kim et al.

(10) Patent No.: US 11,469,468 B2
(45) Date of Patent: Oct. 11, 2022

(54) APPARATUS FOR COOLING VEHICLE BATTERY AND FABRICATION METHOD THEREOF (71) Applicants: Hyundai Motor Company, Seoul (KR); Kia Motors Corporation, Seoul (KR)

(72) Inventors: Tae Hyuck Kim, Asan-Si (KR); Yun Ho Kim, Suwon-Si (KR); Hae Kyu Lim, Bucheon-Si (KR); Gun Goo Lee, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 232 days.

(21) Appl. No.: 16/684,991

(22) Filed: Nov. 15, 2019

(65) Prior Publication Data
US 2021/0028422 A1    Jan. 28, 2021

(30) Foreign Application Priority Data
Jul. 24, 2019   (KR) .................. 10-2019-0089379

(51) Int. Cl.
*B60R 16/04*    (2006.01)
*H01M 50/20*   (2021.01)
(Continued)

(52) U.S. Cl.
CPC ......... *H01M 50/20* (2021.01); *H01M 10/613* (2015.04); *H01M 10/625* (2015.04); *H01M 10/6568* (2015.04)

(58) Field of Classification Search
CPC .... H01M 50/20; H01M 50/249; H01M 50/00; H01M 2220/20; H01M 10/613;
(Continued)

(56) References Cited

U.S. PATENT DOCUMENTS 7,427,156 B2 * 9/2008 Ambrosio ............... B60L 58/27
                                                              429/97
7,993,155 B2 * 8/2011 Heichal ................... B60L 53/80
                                                              180/65.1
(Continued)

FOREIGN PATENT DOCUMENTS

EP              3264492 A1    1/2018
KR     10-2015-0002982 A     1/2015
(Continued)

*Primary Examiner* — James M Dolak
(74) *Attorney, Agent, or Firm* — Morgan, Lewis & Bockius LLP (57) ABSTRACT An apparatus of cooling a vehicle battery is provided. A battery module includes a module housing having an open bottom portion, with an accommodation space for accommodating a plurality of battery cells in the accommodation space, and a plurality of battery cells accommodated in the accommodation space of the module housing, with bottom surfaces of the plurality of battery cells being exposed through the open bottom portion of the module housing. A lower housing has an accommodation space in which the battery module is accommodated. The lower housing includes a cooling unit cooling the battery module and is configured for being attached to a bottom portion of a vehicle floor. Heat-conductive filler is applied on a seating surface of the lower housing, on which the plurality of battery cells are accommodated, to be in contact with the bottom surfaces of the plurality of battery cells exposed externally through the bottom portion of the module housing.

9 Claims, 10 Drawing Sheets (51) Int. Cl.
*H01M 10/613* (2014.01)
*H01M 10/6568* (2014.01)
*H01M 10/625* (2014.01)

(58) Field of Classification Search
CPC .......... H01M 10/625; H01M 10/6568; H01M 10/6556; H01M 10/6551; H01M 10/653; H01M 10/6567; H01M 10/00; H01M 10/60; H01M 10/65; B60L 50/64; B60L 50/60; B60L 50/50; B60L 50/66; B60L 50/00; B60K 1/04; B60K 2001/0438
See application file for complete search history.

(56) References Cited

U.S. PATENT DOCUMENTS

| | | | | |
|---|---|---|---|---|
| 8,568,913 B2* | 10/2013 | Yoon | ................... | H01M 10/657 429/11 |
| 8,859,126 B2* | 10/2014 | Yamada | .............. | H01M 10/625 429/153 |
| 9,070,958 B2* | 6/2015 | Obasih | ................ | H01M 10/625 |
| 9,196,938 B2* | 11/2015 | Yoon | ................... | H01M 10/6555 |
| 9,515,361 B2* | 12/2016 | Harada | ............... | H01M 10/656 |
| 9,731,621 B2* | 8/2017 | Rawlinson | ........ | H01M 10/6568 |
| 9,731,622 B2* | 8/2017 | Rawlinson | ........ | H01M 10/6568 |
| 9,799,932 B2* | 10/2017 | Haskins | .............. | H01M 10/486 |
| 9,905,821 B2* | 2/2018 | Eberhard | ............ | H01M 50/512 |
| 10,547,093 B2* | 1/2020 | Kim | .................... | H01M 10/613 |
| 10,615,470 B2* | 4/2020 | Park | ...................... | H01M 50/24 |
| 10,622,689 B2* | 4/2020 | Chu | ......................... | C08K 5/01 |
| 10,629,967 B2* | 4/2020 | Seo | ........................ | H01M 50/20 |
| 10,700,395 B2* | 6/2020 | Newman | ............. | H01M 10/625 |
| 11,059,382 B2* | 7/2021 | Han | ...................... | H01M 50/578 |
| 11,196,109 B2* | 12/2021 | Bikmukhametov | .... | B60L 50/64 |
| 11,223,079 B2* | 1/2022 | Kim | ..................... | H01M 10/425 |
| 11,245,151 B2* | 2/2022 | Kim | .................. | H01M 10/0468 |
| 11,264,667 B2* | 3/2022 | Baek | ................... | B29C 44/1228 |
| 11,283,118 B2* | 3/2022 | Yoo | ...................... | H01M 10/643 |
| 2013/0004822 A1* | 1/2013 | Hashimoto | ....... | H01M 10/6556 429/120 |
| 2013/0022845 A1* | 1/2013 | Davis | ................... | H01M 50/147 429/96 |
| 2014/0087231 A1* | 3/2014 | Schaefer | ................ | H01G 4/224 429/120 |
| 2015/0004458 A1* | 1/2015 | Lee | ................... | H01M 10/6563 429/120 |

FOREIGN PATENT DOCUMENTS

| | | |
|---|---|---|
| KR | 10-2016-0105354 A | 9/2016 |
| KR | 10-2016-0105355 A | 9/2016 |
| KR | 10-2016-0105357 A | 9/2016 |
| KR | 10-2017-0113466 A | 10/2017 |
| KR | 10-1941114 B1 | 1/2019 |
| KR | 10-1941115 B1 | 1/2019 |
| KR | 10-1941116 B1 | 1/2019 |
| KR | 10-1941117 B1 | 1/2019 |

* cited by examiner

APPARATUS FOR COOLING VEHICLE BATTERY AND FABRICATION METHOD THEREOF

CROSS REFERENCE TO RELATED APPLICATION

The present application claims priority to Korean Patent Application No. 10-2019-0089379, filed Jul. 24, 2019, the entire contents of which is incorporated herein for all purposes by this reference.

BACKGROUND OF THE PRESENT INVENTION

Field of the Invention

The present invention relates to an apparatus for cooling a vehicle battery and, more particularly, to an apparatus for cooling a vehicle battery, the apparatus being able to improve cooling performance by reducing a heat transfer path between a battery cell and a cooling unit cooling the battery cell, and a fabrication method thereof.

Description of Related Art

In a response to popularization of electric vehicles and hybrid vehicles, the importance of batteries has been gradually increasing. Interest in batteries extends from the capacity of batteries to other factors influential to the efficiency, life, or the like, of batteries.

In general, high-voltage and high-capacity batteries used in electric vehicles and hybrid vehicles are respectively comprised of a plurality of battery packs, each of which is provided by combining a plurality of battery cells.

Since a plurality of battery packs is mounted in a limited space, the battery packs generate high-temperature heat, which in turn acts as an adverse effect to the overall life of the batteries. Accordingly, cooling systems for controlling high-temperature heat of high-voltage and high-capacity batteries used in electric vehicles and hybrid vehicles are essentially required. In general, methods of cooling high-voltage and high-capacity batteries for vehicles are categorized into an air-cooling method and a water cooling method, each of which is categorized into an indirect cooling method and a direct cooling method.

A battery system has been cooled by an indirect water cooling method. Battery cells are accommodated in a module housing, thermal conductive filler is located between the bottom surfaces of the plurality of battery cells and a bottom plate of the module housing, and a thermal interface material (TIM) is located between a top plate of a cooling unit cooling the plurality of battery cells and the bottom plate of the module housing. That is, heat generated by the plurality of battery cells is transferred to the cooling unit along a complicated heat transfer path as represented by: the cells→the heat-conductive filler→the bottom plate of the module housing→the TIM→the top plate of the cooling unit-→the cooling water. Due to the complicated heat transfer path, heat loss takes place during heat transfer, lowering cooling performance. Accordingly, the development of a solution able to improve cooling performance by simplifying the heat transfer path has been demanded.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an apparatus of cooling a vehicle battery, the apparatus being able to improve cooling performance by simplifying a heat transfer path, along which heat generated by a battery cell is transferred to a cooling unit, and a fabrication method thereof.

In various aspects of the present invention, there is provided an apparatus of cooling a vehicle battery. The apparatus may include: a battery module including a module housing having an open bottom portion, with an accommodation space for accommodating a plurality of battery cells in the accommodation space, and a plurality of battery cells accommodated in the accommodation space of the module housing, with bottom surfaces of the plurality of battery cells being exposed through the open bottom portion of the module housing; a lower housing having an accommodation space in which the battery module is accommodated, wherein the lower housing includes a cooling unit cooling the battery module and is configured for being attached to a bottom portion of a vehicle floor; and heat-conductive filler applied on a seating surface of the lower housing, on which the plurality of battery cells are accommodated, to be in contact with the bottom surfaces of the plurality of battery cells exposed externally through the bottom portion of the module housing.

The module housing may include a module housing top plate and module housing sidewalls, the accommodation space for accommodating the plurality of battery cells being defined by the module housing top plate and the module housing sidewalls.

The module housing may include a module housing top plate, module housing sidewalls, and a module housing bottom plate, with a predetermined area of the module housing bottom plate being open.

The lower housing may include a top panel, sidewall members provided on a top surface of the top panel along peripheral portions of the top panel to accommodate the battery module in an internal space thereof, and a bottom panel provided below the top panel to protect the battery module.

The cooling unit may include a cooling channel located between the top panel and the bottom panel, the cooling channel allowing cooling water to flow therethrough to cool the battery module.

The cooling channel provided in the cooling unit may be in contact with a bottom surface of the top panel such that closed sections are formed by the bottom surface of the top panel, forming a path along which the cooling water flows.

The lower housing may further include a cooling water inlet, through which the cooling water is introduced into the cooling channel of the cooling unit, and a cooling outlet, through which the cooling water is discharged after having circulated through the cooling channel.

The sidewall members of the lower housing may be provided with a plurality of coupling holes by which the lower housing is attached to the bottom portion of the vehicle floor and a plurality of guide pins configured for guiding attachment of the lower housing to the bottom portion of the vehicle floor.

The bottom portion of the vehicle floor may be provided with a plurality of coupling holes in positions corresponding to positions of the plurality of coupling holes in the sidewall members and guide holes in positions corresponding to positions of the guide pins on the sidewall members.

The apparatus may further include an automatic fastening unit provided on the bottom portion of the vehicle floor to automatically attach or decouple the lower housing to or from the bottom portion of the vehicle floor.

The lower housing may further include a connector provided in a position corresponding to a position of the automatic fastening unit to be automatically connected to or disconnected from the automatic fastening unit.

To achieve the above other objective, various aspects according to various aspects of the present invention, there is provided a fabrication method of an apparatus of cooling a vehicle battery. The fabrication method may include: providing a lower housing to be attached to a bottom portion of a vehicle floor, the lower housing having an accommodation space for accommodating a battery module and including a cooling unit cooling the battery module; applying heat-conductive filler on a seating surface of the lower housing on which the battery module is accommodated; and mounting the battery module on the lower housing on which the heat-conductive filler is applied.

Before the step of mounting the battery module on the lower housing on which the heat-conductive filler is applied, the fabrication method may further include: providing the module housing configured such that a bottom portion thereof is open and having defined therein the accommodation space for accommodating a plurality of battery cells; and providing the battery module by mounting the plurality of battery cells in the accommodation space of the module housing.

In the step of providing the battery module by mounting the plurality of battery cells in the accommodating space of the module housing, bottom surfaces of the plurality of battery cells may be exposed externally through the open bottom portion of the module housing.

After the step of mounting the battery module on the lower housing on which the heat-conductive filler is applied, the fabrication method may further include: fitting guide pins of the lower housing to guide holes in the bottom portion of the vehicle floor and attaching a connector of the lower housing to an automatic fastening unit provided on the bottom portion of the vehicle floor; and attaching the lower housing to the bottom portion of the vehicle floor by fitting bolts to coupling holes provided in sidewall members and the bottom portion of the vehicle floor.

According to an exemplary embodiment of the present invention, it is possible to improve overall cooling performance by simplifying a heat transfer path, along which heat generated by a battery cell is transferred to a cooling unit.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, the present invention will be described in detail with reference to the accompanying drawings. The terminologies or words used in the specification and the appended claims of the present invention may not be interpreted as being limited merely to common and dictionary meanings. On the other hand, they may be interpreted on the basis of the meanings and concepts of the present invention in compliance with the scope of the present invention on the basis of the principle that the inventor(s) can appropriately define the terms to describe the present invention in the best way.

Accordingly, as embodiments explained in the present description and the configurations illustrated in the drawings only suggest one most exemplary embodiment and do not present all technical spirits of the present invention, it must be understood that diverse equivalences and modifications that can replace them were possible at the time when the present invention was made.

Figure 1:
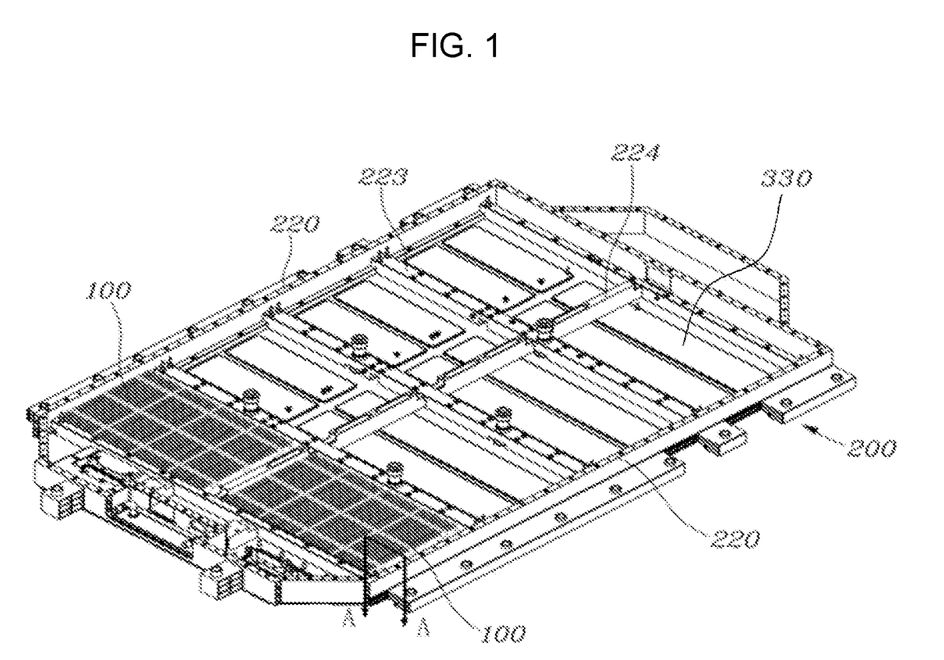
FIG. 1 is a perspective view exemplarily illustrating an apparatus of cooling a battery according to an exemplary embodiment of the present invention.
Figure 2:
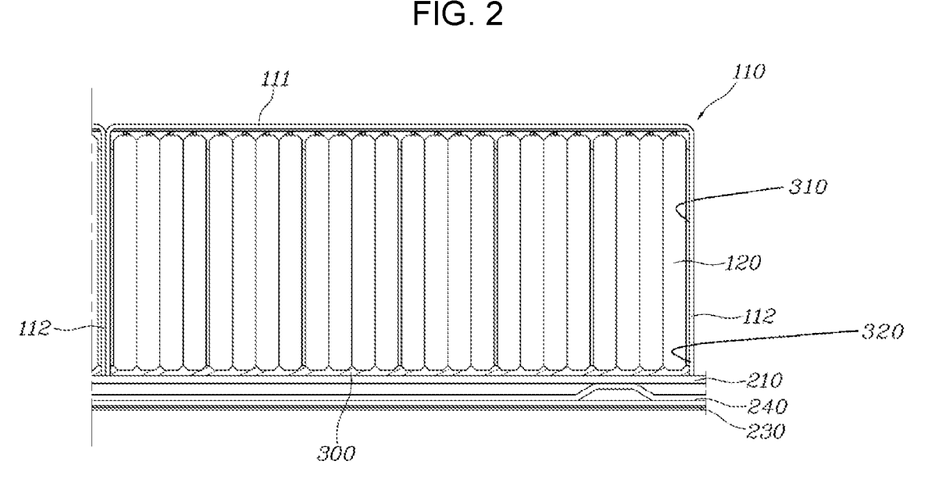
FIG. 2 is a cross-sectional view taken along line A-A in FIG. 1.
Figure 3:
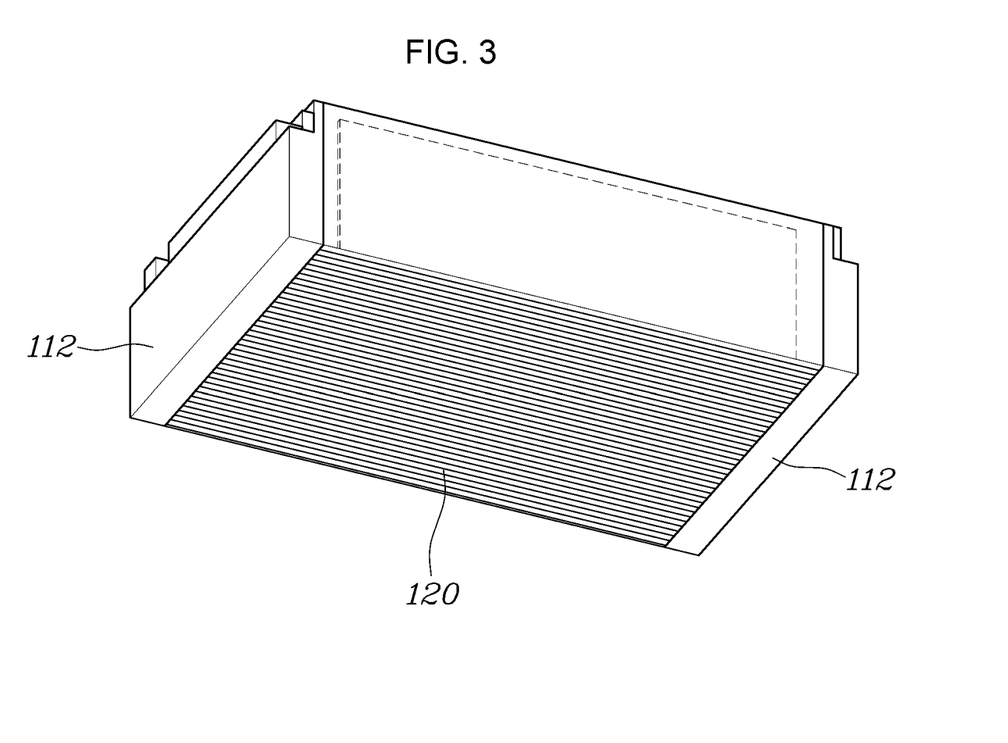
FIG. 3 is a perspective view of the battery module in the apparatus of cooling a battery according to the exemplary embodiment of the present invention.
Figure 4:
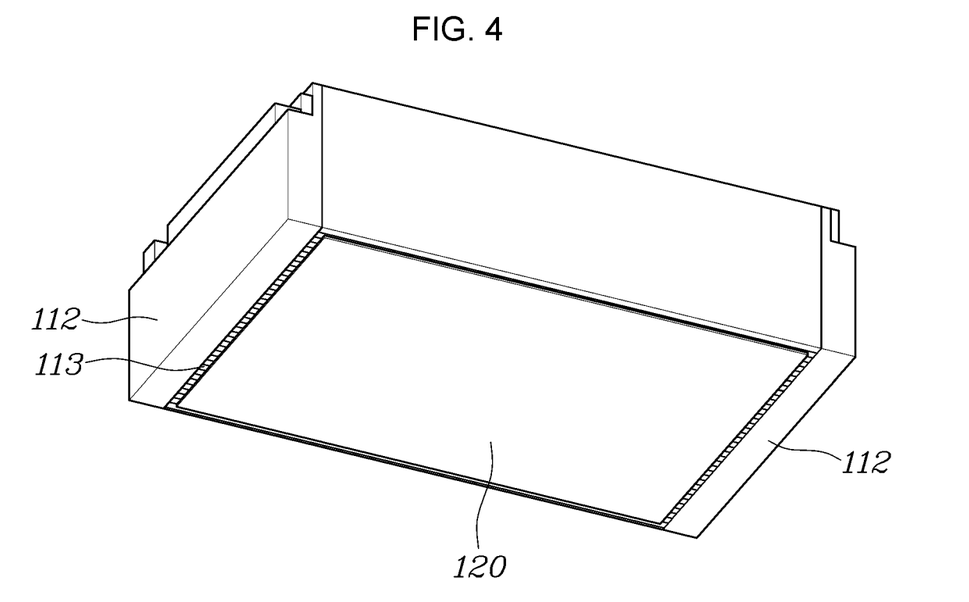
FIG. 4 is a perspective view of a battery module in an apparatus of cooling a battery according to various exemplary embodiments of the present invention.
Figure 5:
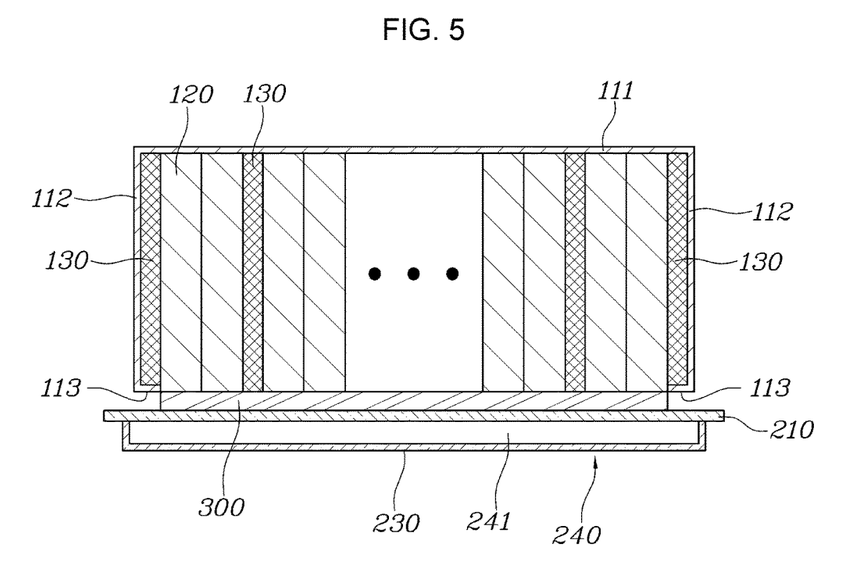
FIG. 5 is a cross-sectional view of the apparatus of cooling a battery according to the other embodiment of the present invention.
Figure 6:
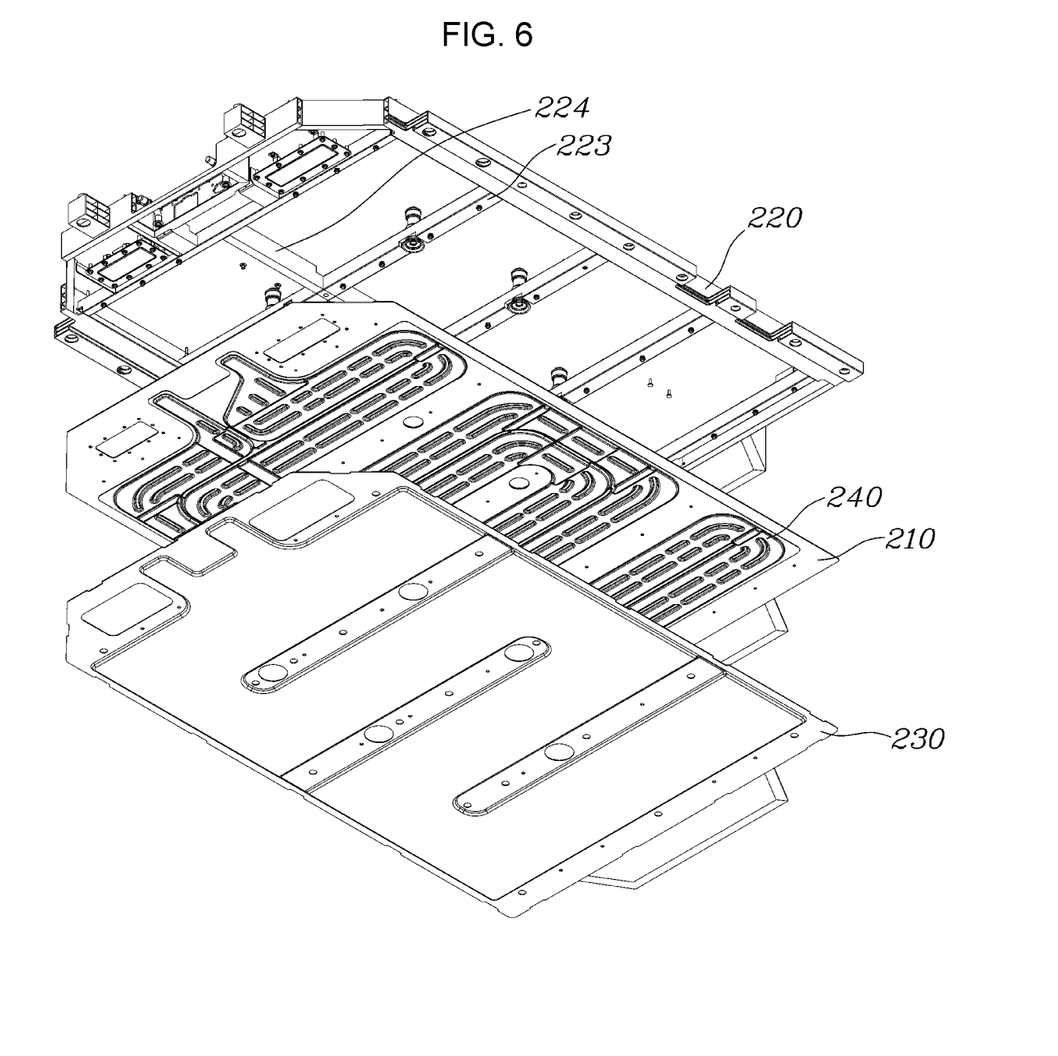
FIG. 6 is an exploded perspective view of a lower housing in the apparatus of cooling a battery according to the exemplary embodiment of the present invention.
Figure 7:
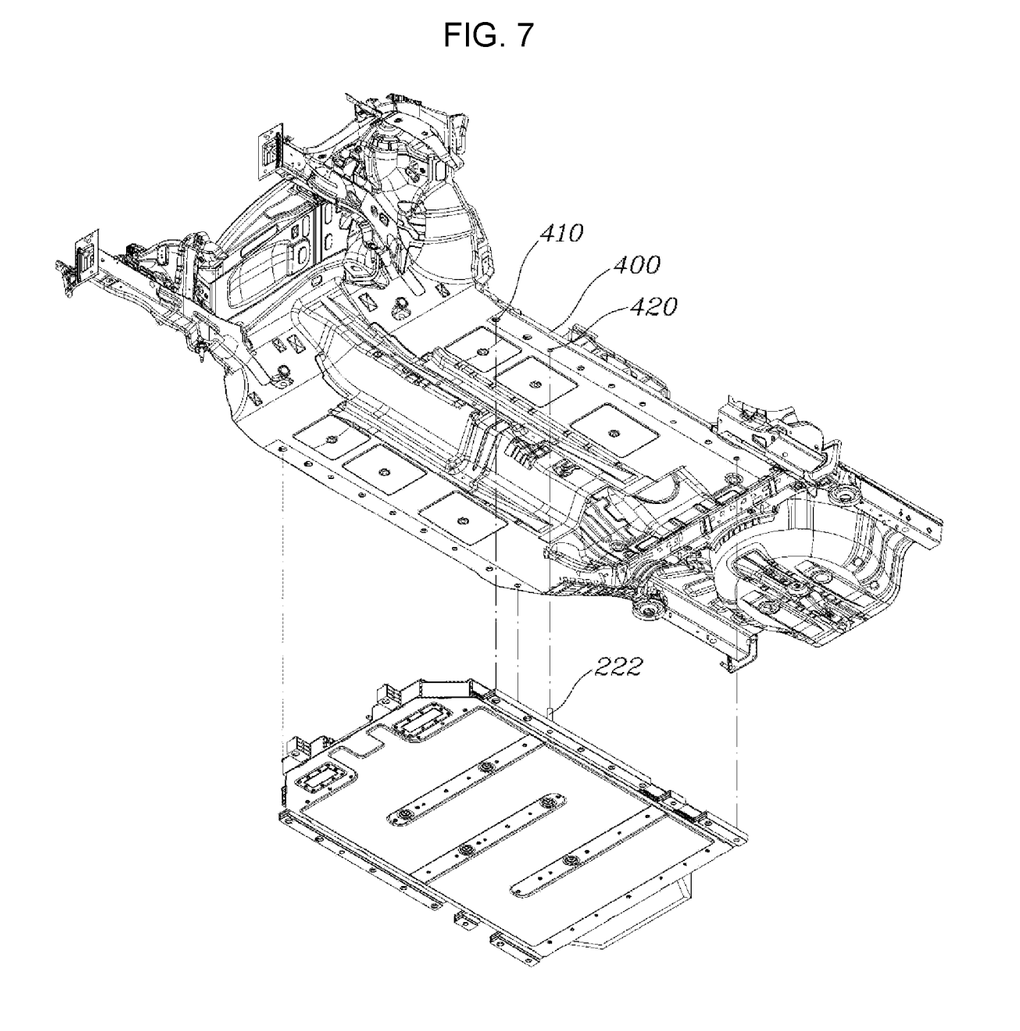
FIG. 7 is a perspective view exemplarily illustrating the attachment of the lower housing of the apparatus of cooling a battery according to the exemplary embodiment of the present invention to a bottom portion of a vehicle floor.
Figure 8:
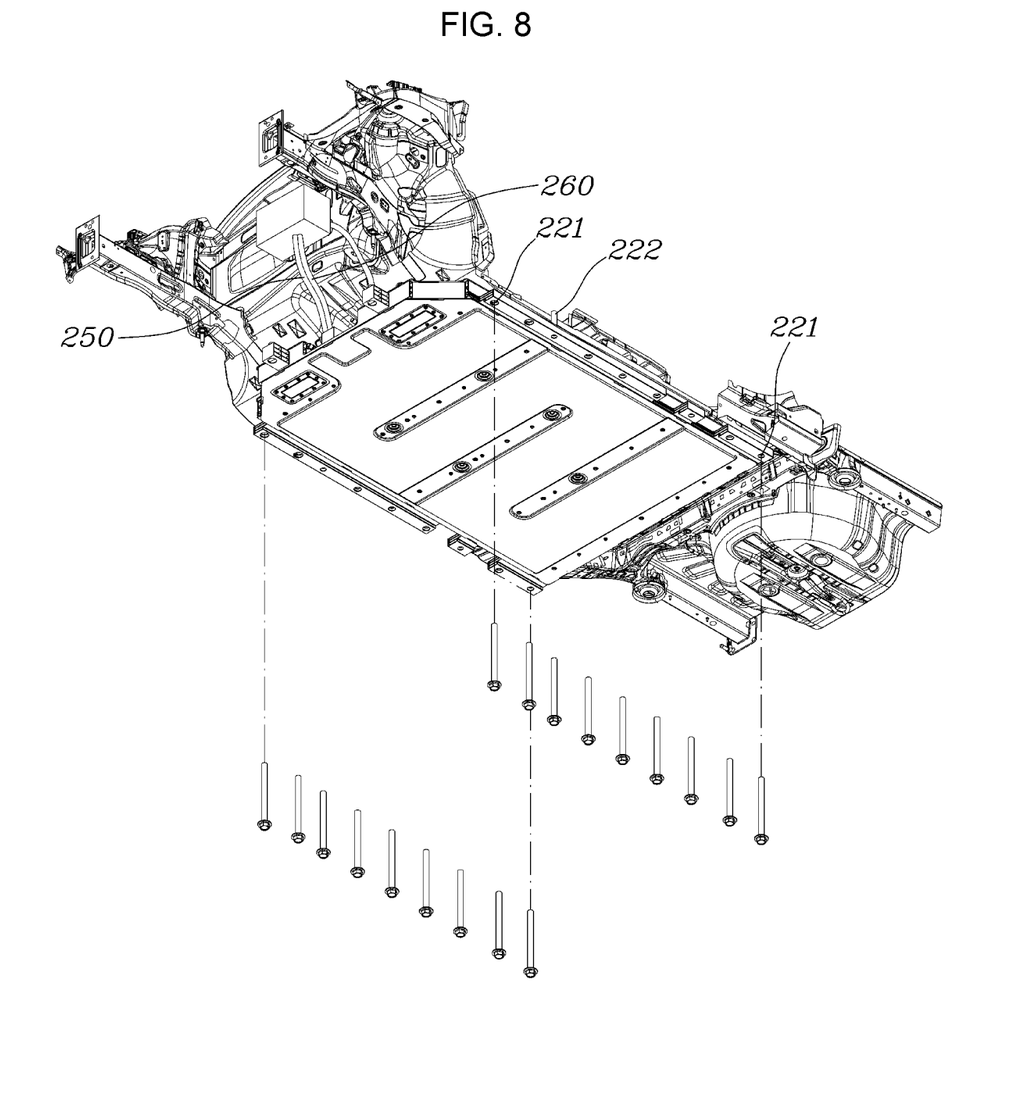
FIG. 8 is a perspective view exemplarily illustrating the attachment of the lower housing of the apparatus of cooling a battery according to the exemplary embodiment of the present invention to the bottom portion of the vehicle floor using a plurality of coupling holes formed in the lower housing and guide pins.
Figure 9:
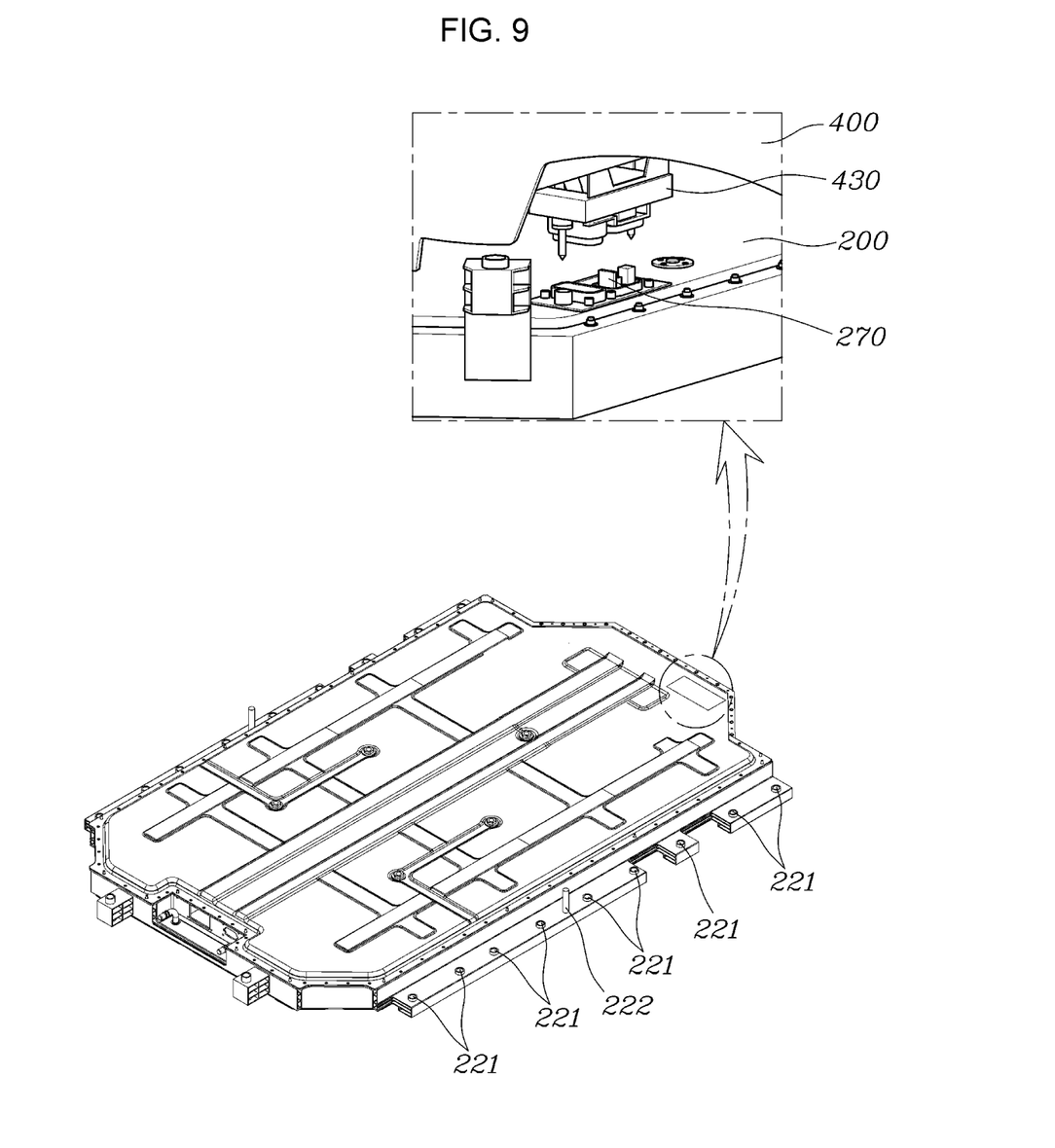
FIG. 9 is a perspective view exemplarily illustrating the attachment of a connector of the lower housing of the apparatus of cooling a battery according to the exemplary embodiment of the present invention to an automatic fastening unit provided on the bottom portion of the vehicle floor.

FIG. 1 is a perspective view exemplarily illustrating an apparatus of cooling a battery according to an exemplary embodiment of the present invention, FIG. 2 is a cross-sectional view taken along line A-A in FIG. 1, FIG. 3 is a perspective view of the battery module in the apparatus of cooling a battery according to the exemplary embodiment of the present invention, FIG. 4 is a perspective view of a battery module in an apparatus of cooling a battery according to various exemplary embodiments of the present invention, FIG. 5 is a cross-sectional view of the apparatus of cooling a battery according to the other embodiment of the present invention, FIG. 6 is an exploded perspective view of a lower housing in the apparatus of cooling a battery according to the exemplary embodiment of the present invention, FIG. 7 is a perspective view exemplarily illustrating the attachment of the lower housing of the apparatus of cooling a battery according to the exemplary embodiment of the present invention to a bottom portion of a vehicle floor, FIG. 8 is a perspective view exemplarily illustrating the attachment of the lower housing of the apparatus of cooling a battery according to the exemplary embodiment of the present invention to the bottom portion of the vehicle floor using a plurality of coupling holes formed in the lower housing and guide pins, and FIG. 9 is a perspective view exemplarily illustrating the attachment of a connector of the lower housing of the apparatus of cooling a battery according to the exemplary embodiment of the present invention to an automatic fastening unit provided on the bottom portion of the vehicle floor.

Referring to FIGS. 1 to 9, the apparatus of cooling a vehicle battery according to the exemplary embodiment of the present invention may include a battery module 100, a lower housing 200, and heat-conductive filler 300.

Referring to FIG. 1, FIG. 2, and FIG. 3, the battery module 100 may include a module housing 110 and a plurality of battery cells 120. The module housing 110 is configured such that the bottom thereof is open and an accommodation space for accommodating the plurality of battery cells 120 is defined therein. The plurality of battery cells 120 are accommodated in the accommodation space 310 of the module housing 110, with the bottom surfaces thereof being exposed through the open bottom portion 320 of the module housing 110.

As illustrated in FIG. 2 and FIG. 3, the module housing 110 according to the exemplary embodiment of the present invention includes a module housing top plate 111 and module housing sidewalls 112. The accommodation space for accommodating the plurality of battery cells 120 may be defined in the module housing 110 by the module housing top plate 111 and the module housing sidewalls 112. As described above, the module housing 110 according to the exemplary embodiment of in various aspects of the present invention, the bottom thereof is open, with no bottom plate being provided. When the plurality of battery cells 120 are mounted in the accommodation space defined in the module housing 110, the bottoms of the plurality of battery cells 120 may be exposed externally through the open bottom portion of the module housing 110.

As illustrated in FIG. 4 and FIG. 5, the module housing 110 according to various exemplary embodiments of the present invention may include the module housing top plate 111, the module housing sidewalls 112, and a module housing bottom plate 113, with a specific area of the module housing bottom plate 113 being open. As described above, the module housing 110 according to the other embodiment of in various aspects of the present invention, a specific area of the module housing bottom plate 113 is open. When the plurality of battery cells 120 are mounted in the accommodation space defined in the module housing 110, the bottoms of the plurality of battery cells 120 may be exposed externally through the open area of the module housing 113.

Furthermore, the plurality of battery cells 120, accommodated in the module housing 110, may be stacked on one another while being in surface-contact with each other. Surface-contact pads 130 may be located between the plurality of battery cells 120 to apply uniform surface pressure to the plurality of battery cells 120. In various exemplary embodiments of the present invention, one material selected from among, but not limited to, thermal grease, a thermal interface material (TIM), and double-sided tape, may be located between the adjacent battery cells 120.

The lower housing 200 may have an accommodation space 330 in which the battery module 100 is accommodated, include a cooling unit 240 cooling the battery module 100, and be attached to a bottom portion of a floor 400 of a vehicle.

Referring to FIG. 6, the lower housing 200 may include a top panel 210, sidewall members 220 provided on the top surface of the top panel 210 along peripheral portions of the top panel 210 to accommodate the battery module 100 in an internal space thereof, and a bottom panel 230 provided below the top panel 210 to protect the battery module 100. In various exemplary embodiments of the present invention, the top panel 210 and the bottom panel 230 may have the shape of a flat panel made of an aluminum (Al) material. However, the Al material is only used as a material to reduce the mass of respective panels to reduce the overall weight of the lower housing, and a variety of materials, other than the Al material, may be used for the top panel 210 and the bottom panel 230.

Furthermore, one or more lateral members 223 increasing lateral strength of the lower housing 200 and one or more longitudinal members 224 increasing longitudinal strength of the lower housing 200 may be provided in the internal space of the sidewall members 220. Here, the battery module 100 may be accommodated in spaces defined by the lateral members 223 and longitudinal members 224.

The cooling unit 240 cooling the battery module 100 may have a cooling channel 241 located between the top panel 210 and the bottom panel 230. The cooling channel 241 allows cooling water to flow therethrough to cool the battery module 100. The cooling channel 241 provided in the cooling unit 240 may be in contact with the bottom surface of the top panel 210 such that closed sections are formed by the bottom surface of the top panel 210, forming a path along which the cooling water flows.

As illustrated in FIG. 8, the lower housing 200 may further include a cooling water inlet 250, through which the cooling water is introduced into the cooling channel 241 of the cooling unit 240, and a cooling outlet 260, through which the cooling water is discharged after having circulated through the cooling channel 241.

Furthermore, the sidewall members 220 of the lower housing 200 may have a plurality of coupling holes 221 by which the lower housing 200 is attached to the bottom portion of the vehicle floor 400 and a plurality of guide pins 222 guiding the attachment of the lower housing 200 to the bottom portion of the vehicle floor 400. Here, the guide pins 222 may be three or more guide pins. Furthermore, the bottom portion of the vehicle floor 400 may be provided with a plurality of coupling holes 410 in positions corresponding to the positions of the plurality of coupling holes 221 in the sidewall members 220 and guide holes 420 in positions corresponding to the positions of the guide pins 222 on the sidewall members 220. Furthermore, as illustrated in FIG. 9, an automatic fastening unit 430 may be provided on the bottom portion of the vehicle floor 400. The automatic fastening unit 430 is configured to automatically attach or decouple the lower housing 400 to or from the bottom portion of the vehicle floor 400. The lower housing 200 may further include a connector 270 provided in a position corresponding to the position of the automatic fastening unit 430 to be automatically connected to or disconnected from the automatic fastening unit 430. Here, the automatic fastening unit 430 may be a quick drop connector according to various exemplary embodiments.

The heat-conductive filler 300 may be applied on a seating surface of the lower housing 200, on which the plurality of battery cells 120 are accommodated, to be in contact with the bottom surfaces of the plurality of battery cells 120 exposed externally through the bottom portion of the module housing 110. As described above, the apparatus of cooling a vehicle battery according to an exemplary embodiment of in various aspects of the present invention, the bottom portion of the module housing 110 is entirely open, with no bottom plate being provided, or a predetermined area of the bottom portion of the module housing 110 is open, with a predetermined area of the bottom plate 113 of the module housing 110 being open. When the plurality of battery cells 120 are mounted in the accommodate space defined in the module housing 110, the bottom surfaces of the plurality of battery cells 120 may be exposed externally through the open bottom portion of the module housing 110. The exposed bottom surfaces of the plurality of battery cells 120 may be in contact with the heat-conductive filler 300 applied on the top surface of the top panel 210 of the lower housing 200, the bottom surface of which is in contact with the cooling channel, through which the cooling water flows. The heat-conductive filler 300 can transfer heat from the plurality of battery cells 120 to the cooling water. In other words, the apparatus of cooling a vehicle battery according to an exemplary embodiment of the present invention can transfer the heat generated by the plurality of battery cells 120 along a heat transfer path as represented by: the plurality of battery cells 120→the heat-conductive filler 300→the top panel 210→the cooling unit 240. In the present manner, the present invention can simplify the heat transfer path of the heat generated by the plurality of battery cells 120 according to the above-described configurations to minimize heat loss occurring during the heat transfer process performed along the complicated heat transfer path of the related art, improving cooling performance.

Figure 10:
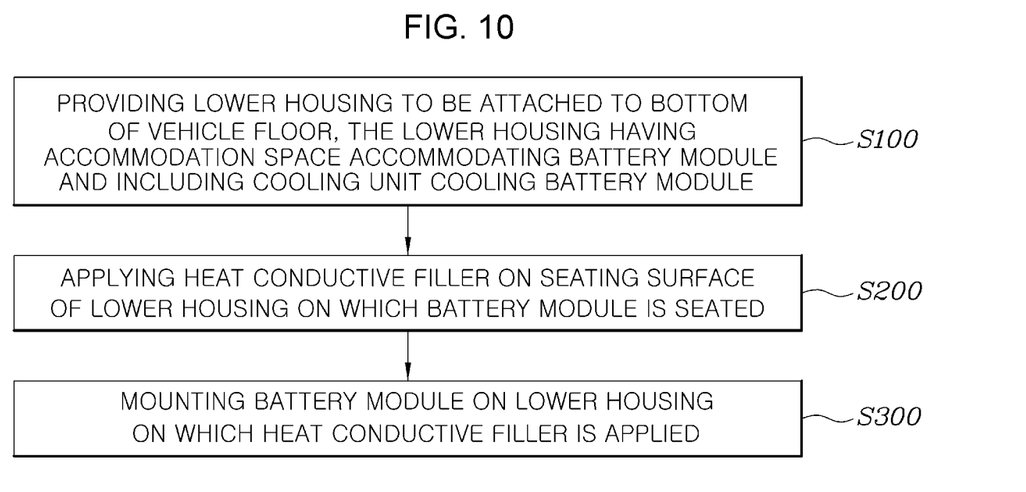
FIG. 10 is a flowchart illustrating a method of fabricating the apparatus of cooling a battery according to the exemplary embodiment of the present invention.

FIG. 10 is a flowchart illustrating a fabrication method of the apparatus of cooling a battery according to the exemplary embodiment of the present invention. Referring to FIG. 10, the fabrication method of the apparatus of cooling a battery according to the exemplary embodiment of the present invention may include: step S100 of providing the lower housing to be attached to the bottom portion of the vehicle floor, the lower housing having the accommodation space for accommodating the battery module and including the cooling unit cooling the battery module; step S200 of applying heat-conductive filler on the seating surface of the lower housing on which the battery module is accommodated; and step S300 of mounting the battery module on the lower housing on which the heat-conductive filler is applied.

Furthermore, the fabrication method may further include: a step of providing the module housing configured such that the bottom thereof is open and having defined therein the accommodation space for accommodating a plurality of battery cells; and a step of providing the battery module by mounting the plurality of battery cells in the accommodation space of the module housing, before the step of mounting the battery module on the lower housing on which the heat-conductive filler is applied.

Furthermore, in the step of providing the battery module by mounting the plurality of battery cells in the accommodation space of the module housing, the bottom surfaces of the plurality of battery cells may be exposed externally through the open bottom portion of the module housing. Furthermore, the bottom surfaces of the plurality of battery cells, exposed externally through the open bottom portion of the module housing, may be in contact with the heat-conductive filler to transfer heat from the plurality of battery cells to the heat-conductive filler.

Furthermore, the fabrication method may further include: a step of fitting the guide pins of the lower housing to the guide holes in the bottom portion of the vehicle floor and attaching the connector of the lower housing to the automatic fastening unit provided on the bottom portion of the vehicle floor; and a step of attaching the lower housing to the bottom portion of the vehicle floor by fitting bolts to the coupling holes provided in the sidewall members and the bottom portion of the vehicle floor, after the step of mounting the battery module on the lower housing on which the heat-conductive filler is applied. For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An apparatus for cooling a battery, the apparatus comprising:
a battery module including a module housing having an open bottom portion, with a first accommodation space for accommodating a plurality of battery cells in the first accommodation space wherein bottom surfaces of the plurality of battery cells are exposed through the open bottom portion of the module housing;
a lower housing having a second accommodation space in which the battery module is accommodated, wherein the lower housing includes a cooling unit cooling the battery module and is attached to a bottom portion of a vehicle floor; and heat-conductive filler applied on a seating surface of the lower housing, on which the plurality of battery cells are accommodated, to be in contact with the bottom surfaces of the plurality of battery cells exposed externally through the open bottom portion of the module housing, wherein the lower housing includes a top panel and sidewall members mounted on a top surface of the top panel along peripheral portions of the top panel to accommodate the battery module in the second accommodation space formed of the top panel and the sidewall members, and a bottom panel mounted below the top panel to protect the battery module, wherein when the plurality of battery cells are accommodated in the first accommodation space of the module housing, a top and sides of the battery cells are surrounded by the module housing, wherein the second accommodation space of the lower housing is formed by the top panel and the sidewall members of the lower housing and is divided by one or more lateral members;

wherein the one or more lateral members of the lower housing, the top panel and the bottom panel include respectively one or more securing holes, and wherein when the lower housing, the top panel and the bottom panel are stacked and coupled to each other, the one or more securing holes are aligned in a stack direction.

2. The apparatus according to claim 1, wherein the module housing includes a module housing top plate and module housing sidewalls, and wherein the first accommodation space is provided to accommodate the plurality of battery cells in the module housing top plate and the module housing sidewalls.

3. The apparatus according to claim 1, wherein the module housing includes a module housing top plate, module housing sidewalls, and a module housing bottom plate, with a predetermined area of the module housing bottom plate being open.

4. The apparatus according to claim 1,
wherein the heat-conductive filler is mounted between the bottom surfaces of the plurality of battery cells and the top panel of the lower housing.

5. The apparatus according to claim 1, wherein the cooling unit includes a cooling channel located between the top panel and the bottom panel of the lower housing, the cooling channel allowing cooling water to flow therethrough to cool the battery module.

6. The apparatus according to claim 5, wherein the cooling channel mounted in the cooling unit is in contact with a bottom surface of the top panel so that closed sections are formed by the bottom surface of the top panel, forming a path along which the cooling water flows.

7. The apparatus according to claim 5, wherein the lower housing further includes a cooling water inlet, through which the cooling water is introduced into the cooling channel of the cooling unit, and a cooling water outlet, through which the cooling water is discharged after having circulated through the cooling channel.

8. The apparatus according to claim 5,
wherein the sidewall members of the lower housing are formed with a plurality of coupling holes by which the lower housing is attached to the bottom portion of the vehicle floor and a plurality of guide pins are provided to guide attachment of the lower housing to the bottom portion of the vehicle floor, and wherein the bottom portion of the vehicle floor is formed with a plurality of coupling holes in positions corresponding to positions of the plurality of coupling holes in the sidewall members and guide holes in positions corresponding to positions of the guide pins on the sidewall members.

9. The apparatus according to claim 1, further including:
an automatic fastening unit mounted on the bottom portion of the vehicle floor to automatically attach or decouple the lower housing to or from the bottom portion of the vehicle floor, wherein the lower housing further includes a connector mounted in a position corresponding to a position of the automatic fastening unit to be automatically connected to or disconnected from the automatic fastening unit.

* * * * *